United States Patent
Kakitsuba et al.

(10) Patent No.: US 11,520,540 B2
(45) Date of Patent: Dec. 6, 2022

(54) PRINTING SYSTEM INCLUDING SERVER DEVICE STORING PRINT DATA RECEIVED FROM CLIENT DEVICE IN FOLDER ACCESSIBLE FROM EXTERNAL DEVICE

(71) Applicant: BROTHER KOGYO KABUSHIKI KAISHA, Nagoya (JP)

(72) Inventors: Ryota Kakitsuba, Nagoya (JP); Yushi Ichikawa, Aichi-ken (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/324,631

(22) Filed: May 19, 2021

(65) Prior Publication Data

US 2021/0365221 A1 Nov. 25, 2021

(30) Foreign Application Priority Data

May 21, 2020 (JP) .............................. JP2020-088749
Oct. 8, 2020 (JP) .............................. JP2020-170320

(51) Int. Cl.
*G06F 3/12* (2006.01)

(52) U.S. Cl.
CPC ............ *G06F 3/1222* (2013.01); *G06F 3/127* (2013.01); *G06F 3/1238* (2013.01); *G06F 3/1288* (2013.01)

(58) Field of Classification Search
None
See application file for complete search history.

(56) References Cited

U.S. PATENT DOCUMENTS

| | | | |
|---|---|---|---|
| 6,757,705 B1* | 6/2004 | Pardikar | G06F 16/182 711/137 |
| 2006/0274367 A1* | 12/2006 | Yamamoto | G06F 3/1204 358/1.15 |
| 2007/0288714 A1* | 12/2007 | Nakamura | G06F 21/6218 711/163 |
| 2008/0201617 A1* | 8/2008 | Ohara | H04N 1/00795 709/201 |
| 2009/0222420 A1* | 9/2009 | Hirata | G06F 16/168 |
| 2010/0253975 A1* | 10/2010 | Ida | G06F 3/124 358/1.15 |
| 2011/0069339 A1* | 3/2011 | Huang | G06F 3/1204 358/1.15 |

FOREIGN PATENT DOCUMENTS

JP  2010-244550 A  10/2010

* cited by examiner

*Primary Examiner* — Thomas D Lee
(74) *Attorney, Agent, or Firm* — Scully, Scott, Murphy & Presser, PC

(57) ABSTRACT

In a server device, a memory is configured to store a folder corresponding to each of a plurality of users. User permissions are set for the folder to indicate whether access to the folder is allowed. A client device is configured to perform transmitting print data to the server device. The print data is associated with identification information for identifying a user. A set of program instructions causes the server device to perform: in response to receiving the print data from the client device, storing the print data in the folder corresponding to the user identified by the identification information associated with the print data. A printer is configured to perform: receiving an input of the identification information; identifying the folder corresponding to the user identified by the identification information; acquiring the print data stored in the folder; and printing an image based on the print data.

19 Claims, 7 Drawing Sheets

PRINTING SYSTEM INCLUDING SERVER DEVICE STORING PRINT DATA RECEIVED FROM CLIENT DEVICE IN FOLDER ACCESSIBLE FROM EXTERNAL DEVICE

CROSS REFERENCE TO RELATED APPLICATION

This application claims priorities from Japanese Patent Application No. 2020-088749 filed May 21, 2020 and Japanese Patent Application No. 2020-170320 filed Oct. 8, 2020. The entire content of each of these priority applications is incorporated herein by reference.

TECHNICAL FIELD

The present disclosure relates to a printing system including a server device connected to printers and client devices and a non-transitory computer-readable medium storing a set of program instructions.

BACKGROUND

A conventional system possesses a server device that is connected to a printer and a client device. The server device receives print data transmitted from the client device and stores the print data in memory. Thereafter, the printer receives the print data from the server device and performs a printing operation based on the print data.

One example of the configuration described above is a network printing system provided with a print server. When the print server receives print data from a terminal device, the print server stores the print data in a user-specific folder. When subsequently accessed by a printer, the print server transmits the print data to the requesting printer.

SUMMARY

Much print data is highly confidential and requires a high level of security. Consequently, it is desirable to restrict access to storage locations for print data stored on the server device to prevent indiscriminate access of print data. At the same time, it is desirable for authorized printers to be able to access these storage locations. The conventional technology does not address security for the storage locations of print data and, hence, has room for improvement.

In view of the foregoing, it is an object of the present disclosure to provide a technology that enhances the security of print data on a printing system having a server device connected to printers and client devices.

In order to attain the above and other objects, the present disclosure provides a printing system that includes: a printer; a server device; and a client device. The server device is connectable to the printer. The server device includes: a computer; and a memory. The memory is configured to store therein a set of program instructions, and a folder corresponding to each of a plurality of users. The folder is a shared folder accessible from an external device other than the server device. User permissions are set for the folder to indicate whether access to the folder is allowed. The user permissions allow the printer to access to the folder. The client device is connectable to the server device. The client device is configured to perform: (a) transmitting. The (a) transmitting transmits print data to the server device. The print data is based on an image to be printed and is associated with identification information for identifying a user. The set of program instructions, when installed on and executed by the computer, causes the server device to perform: in response to receiving the print data from the client device, (b) storing. The (b) storing stores the print data in the folder corresponding to the user identified by the identification information associated with the print data. The printer is configured to perform: (c) receiving; (d) identifying; (e) acquiring; and (f) printing. The (c) receiving receives an input of the identification information. The (d) identifying identifies and accesses the folder corresponding to the user identified by the identification information received in (c). The (e) acquiring acquires the print data stored in the folder identified and accessed in (d). The (f) printing prints the image based on the print data acquired in (e).

According to another aspect, the present disclosure also provides a non-transitory computer readable storage medium storing a set of program instructions. The set of program instructions is installed on and executed by a computer in a server device connectable to a printer and a client device. The server device includes a memory. The memory is configured to store a folder corresponding to each of a plurality of users. The folder is a shared folder accessible from an external device other than the server device. User permissions are set for the folder to indicate whether access to the folder is allowed. The user permissions allow the printer to access to the folder. The set of program instructions includes: (a) acquiring; and (b) storing. The (a) acquiring acquires print data received from the client device. The print data is based on an image to be printed and being associated with identification information for identifying a user. The (b) storing stores the print data in the folder corresponding to the user identified by the identification information associated with the print data acquired in (a). The printer accesses the folder to acquire the print data stored in the folder and prints the image based on the print data.

BRIEF DESCRIPTION OF THE DRAWINGS

The particular features and advantages of the disclosure as well as other objects will become apparent from the following description taken in connection with the accompanying drawings, in which.

DETAILED DESCRIPTION

Next, a printing system according to a first embodiment of the present disclosure will be described while referring to the accompanying drawings. In the printing system according to this embodiment, printers are controlled using personal computers (hereinafter abbreviated as "PC") to execute printing operations.

Figure 1:
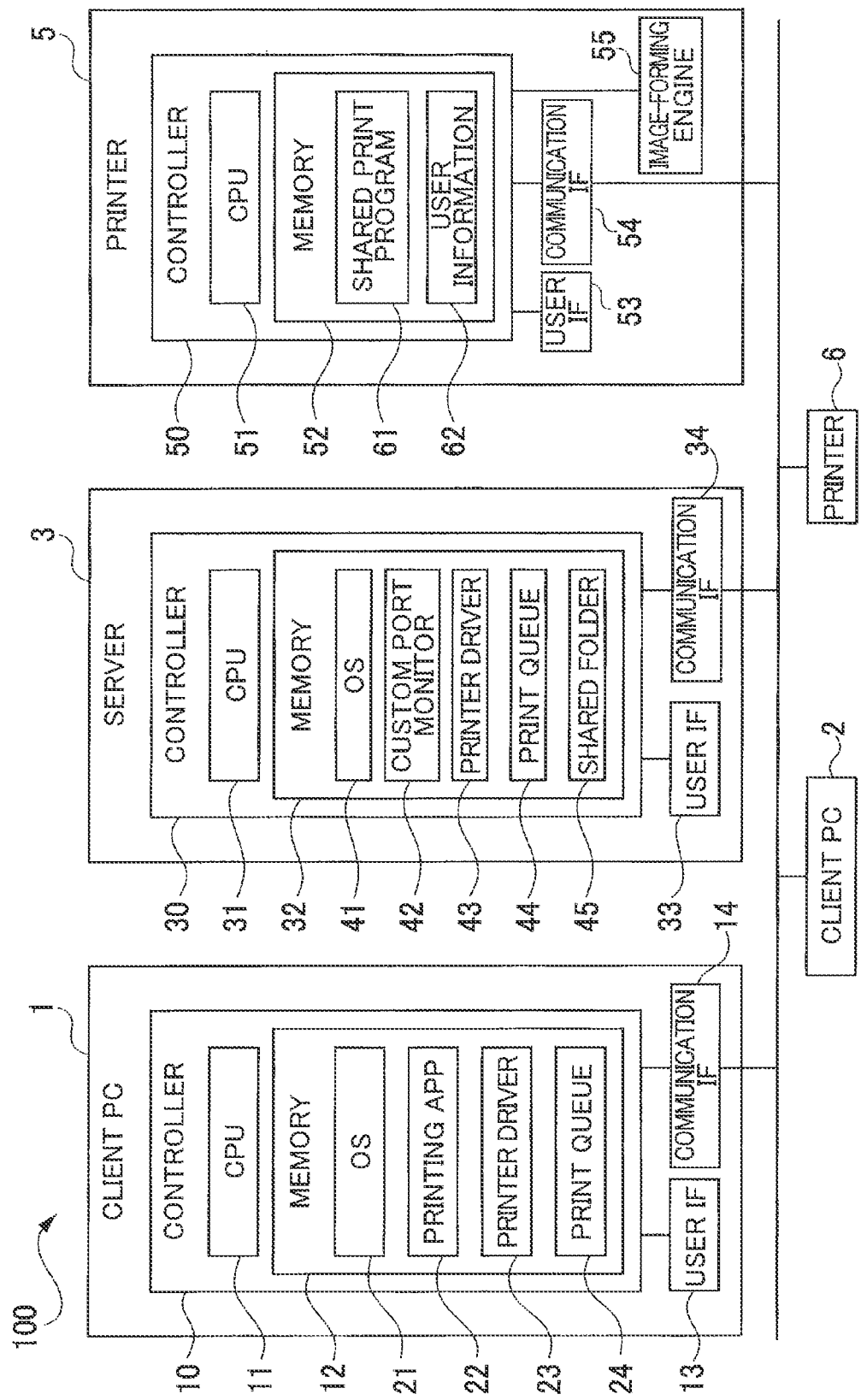
FIG. 1 is a block diagram illustrating an electrical configuration of a printing system provided with a server connected to printers and client PCs according to one embodiment of the present disclosure.

FIG. 1 illustrates a printing system 100. The printing system 100 of the present embodiment includes a plurality of client PCs 1 and 2, a server 3, and a plurality of printers 5 and 6. The client PCs 1 and 2 are an example of the client device of the present disclosure, and the server 3 is an example of the server device of the present disclosure. The printers 5 and 6 are an example of the printer of the present disclosure. The client PCs 1 and 2 are connected to the server 3 and capable of communicating with the same. The server 3 is connected to each of the printers 5 and 6 and capable of communicating with the same. The client PCs 1 and 2 may or may not be capable of communicating with the printers 5 and 6.

The client PCs 1 and 2 in the present embodiment are similar devices that perform similar operations and processes. The client PC 1 will serve as the representative PC in the following example. Additionally, the printers 5 and 6 in the present embodiment are similar devices of the same model that perform similar operations and processes. The printer 5 will be used as the representative printer in the following description.

The client PC 1 of the present embodiment has at least a function for receiving a print instruction through a user operation, and a communication function. As illustrated in FIG. 1, the client PC 1 is provided with a controller 10 that includes a central processing unit (hereinafter abbreviated as "CPU") 11 and a memory 12. The client PC 1 is also provided with a user interface (abbreviated as "user IF" in drawings) 13, and a communication interface (abbreviated as "communication IF" in drawings) 14. The user interface 13 and communication interface 14 are electrically connected to the controller 10. Note that the controller 10 in FIG. 1 and the controllers of other devices described later are a general concept that covers all hardware and software used for controlling the client PC 1 or the like and does not actually represent a single piece of hardware present in the client PC 1 or the like.

The CPU 11 executes various processes according to programs read from the memory 12 or based on user operations. The memory 12 is a storage area for storing various programs and various data. The programs stored in the memory 12 include a startup program for starting up the client PC 1, and various application programs that use the printers 5 and 6. The data stored in the memory 12 includes image data and document data. The memory 12 is also used as a work area for executing various processes.

Examples of the memory in each device such as the memory 12 may be a ROM, a RAM, an HDD, or the like built into the device, or may be any storage medium that is readable and writable by the CPU 11. A computer-readable storage medium is a non-transitory medium. In addition to the above examples, non-transitory media include a CD-ROM and a DVD-ROM. A non-transitory medium is also a tangible medium. On the other hand, electric signals that convey programs downloaded from a server or the like on the Internet are a computer-readable signal medium, which is one type of computer-readable medium but is not considered a non-transitory computer-readable storage medium.

The user interface 13 includes hardware for displaying screens that report information to the user, and hardware for receiving operations performed by the user. The user interface 13 may have a touchscreen that is provided with both a display function and a function for receiving operations or may be a set of devices that include a display provided with a display function and a keyboard, mouse, trackball, or the like provided with operation-receiving functions.

The communication interface 14 includes hardware for communicating with external devices such as the server 3. The communication method of the communication interface 14 may be wired or wireless and may conform to any of various communication standards, such as Ethernet (registered trademark) and Wi-Fi (registered trademark).

As illustrated in FIG. 1, the memory 12 of the client PC 1 stores various data and various programs that include an operating system (hereinafter abbreviated as "OS") 21, a printing application program (abbreviated as "printing app" in drawings) 22, a printer driver 23, and a print queue 24. The OS 21 may be Windows (registered trademark), macOS (registered trademark), iOS (registered trademark), Android (registered trademark), or Linux (registered trademark), for example.

The printing application program 22 is an application program that is used for creating or editing document data or image data, for example, and an application program that can receive a print instruction from the user. The printer driver 23 is a program that generates print data for executing a printing operation on the printers 5 and 6. The print queue 24 is an area allocated for the printer driver 23 and receives print data generated by the printer driver 23.

Note that a shared printer corresponding to one of the printers 5 and 6 is associated with the print queue 24 in the present embodiment through a function of the OS 21. Print data passed to the print queue 24 is transmitted to the server 3 via the communication interface 14 by the OS 21. A shared printer denotes a print queue 44 made available on a network through a function of an OS 41 in the server 3 described later. However, for convenience the following description will also use "shared printer" to describe the printer associated with the print queue accessible on the network.

The server 3 according to the present embodiment is a device having at least a function for storing print data, and a communication function. As illustrated in FIG. 1, the server 3 is provided with a controller 30 that includes a CPU 31 and a memory 32. The CPU 31 is an example of the computer of the present disclosure. The server 3 is also provided with a user interface 33, and a communication interface 34, both of which are electrically connected to the controller 30. The electrical structure of the server 3 is similar to that described for the client PC 1.

As illustrated in FIG. 1, the memory 32 of the server 3 stores various data and various programs including an OS 41, a custom port monitor 42, a printer driver 43, a print queue 44, and a shared folder 45. The OS 41 may be Windows (registered trademark), macOS (registered trademark), or Linux (registered trademark), for example.

The custom port monitor 42 is a customized port monitor that is used to control the operations of the printing system 100 according to the present embodiment. The printer driver 43 is a similar program to the printer driver 23 provided on the client PC 1. The print queue 44 is allocated for the printer driver 43. In the present embodiment, print data transmitted from the client PCs 1 and 2 is transferred to the print queue 44, and the custom port monitor 42 receives the print data transferred to the print queue 44. The shared folder 45 is a folder made available on a network through a function of the OS 41. The shared folder 45 is accessible from external devices other than the server 3, such as the client PCs 1 and 2 and the printers 5 and 6. User permissions are set for the shared folder 45 to indicate whether access is authorized. More specifically, user permissions are set for each folder within the shared folder 45 to indicate whether respective users, program applications, and the like are allowed to access the folder. The custom port monitor 42 is an example of the set of program instructions of the present disclosure.

The printer 5 in the present embodiment is a device shared among users of the printing system 100. The printer 5 has at least a function for printing images based on print data, and a communication function. As illustrated in FIG. 1, the printer 5 is provided with a controller 50 that includes a CPU 51, and a memory 52. The printer 5 is also provided with a user interface 53, a communication interface 54, and an image-forming engine 55, which are all three electrically connected to the controller 50. The memory 52 of the printer 5 stores various data and various programs that include a shared print program 61, and user information 62.

Next, an overview of a procedure for using the client PC 1 to execute a print job on a shared printer such as the printer 5 will be described with reference to sequence charts. First, a first procedure for issuing a print instruction on the client PC 1 will be described, followed by a second procedure for executing a print on the printer 5.

Figure 2:
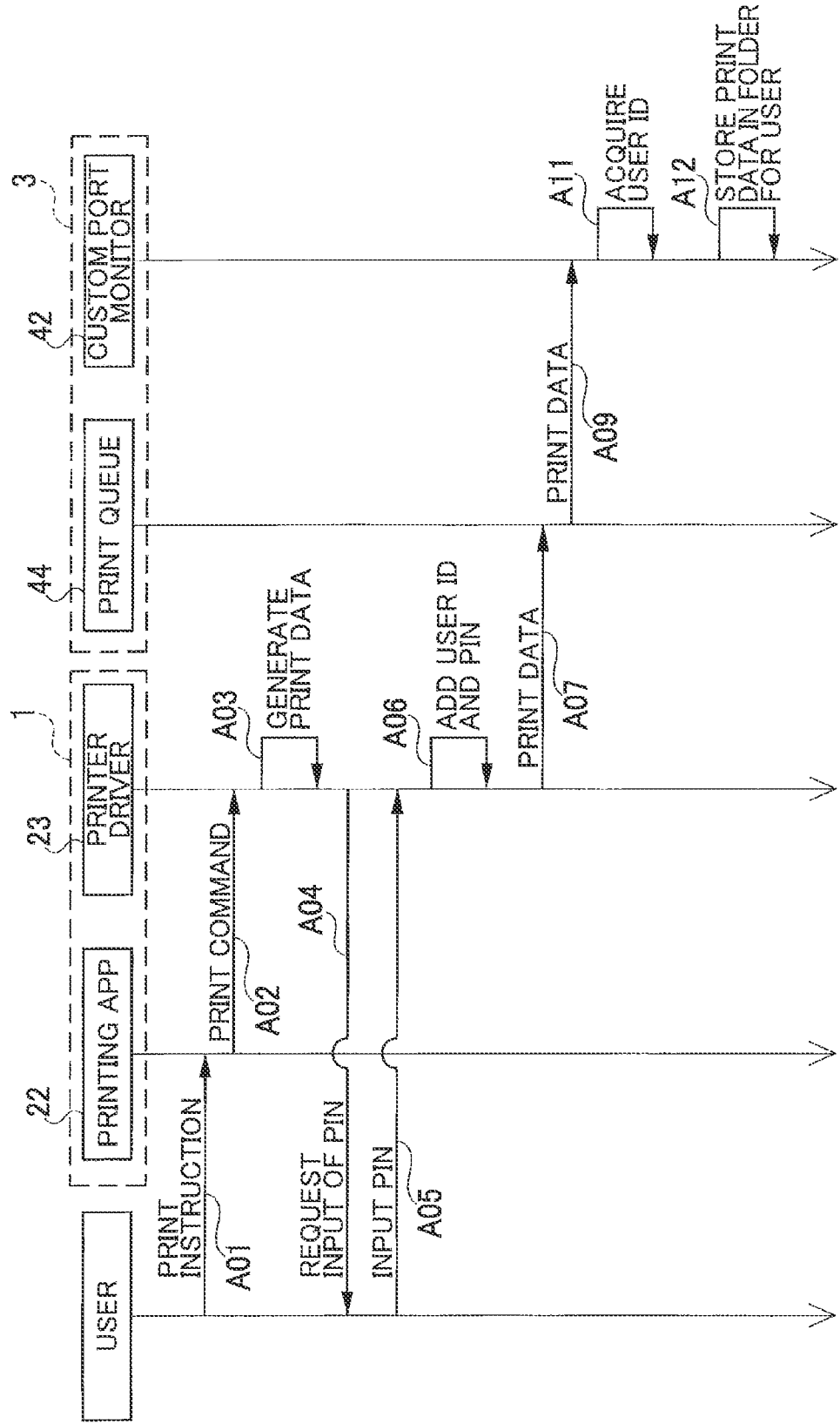
FIG. 2 is a sequence chart illustrating an overview of a first procedure for storing print data in a shared folder provided in the server of the printing system according to a first embodiment of the present disclosure.

First, an overview of the first procedure will be described with reference to FIG. 2. In the first procedure, the user logs in to the client PC 1 and issues an instruction (print instruction) in the printing application program 22 or the like to print (A01). The user can issue a print instruction via the printing application program 22 or the like specifying a print queue registered with the OS 21. FIG. 2 indicates a case in which the print instruction from the user is an instruction for a secure print specifying the print queue 24. A secure print is a printing method that enhances the security of print data by requiring a personal identification number (hereinafter abbreviated as "PIN") set in the print instruction to be inputted into the printer that has received the print instruction before printing can be executed.

The printing application program 22 starts up the printer driver 23 corresponding to the print queue 24 according to the received print instruction and transfers a print command to the printer driver 23 (A02). The print command includes image data representing an image to be printed, and parameters related to printing.

The printer driver 23 generates print data for executing a printing operation on the printer 5 based on the print command received from the printing application program 22 (A03). Since the print instruction is set to a secure print, the printer driver 23 displays an input screen on the user interface 13 for receiving entry of a PIN (A04). The PIN is configured of a four-digit numeric string, for example. The PIN is an example of the authentication information of the present disclosure. The user decides on a PIN for the current print data and inputs the PIN via the user interface 13 (A05). Note that the input of the PIN may be received prior to receiving the print instruction.

The printer driver 23 adds the user ID for the user currently logged in to the client PC 1 and the inputted PIN to the print data generated in A03 (A06). The user ID is an example of identification information for identifying individual users. The user ID may be an account name, or an employee number, for example. Further, a username described later may be also used as the user ID itself. The printer driver 23 may acquire the user ID through a request to the OS 21. The printer driver 23 transfers the print data with the added user ID and PIN to the print queue 24. The OS 21 of the client PC 1 also transmits the print data transferred to the print queue 24 to the server 3 while specifying the print queue 44 associated with the print queue 24 (A07).

Upon receiving print data specifying the print queue 44 from the client PC 1, the server 3 starts up the custom port monitor 42 associated with the print queue 44 and transfers the print data to the custom port monitor 42 (A09). Note that the print queue 44 may be configured to transfer the print data to the printer driver 43, the printer driver 43 may process the print data and transfer the processed data to the print queue 44, and the print queue 44 may transfer the print data to the custom port monitor 42. Alternatively, the printer driver 43 may be configured to transfer the processed print data to the custom port monitor 42 directly. Also, the custom port monitor 42 may be started when the server 3 is started up and may reside in memory, for example.

The custom port monitor 42 acquires the user ID added to the acquired print data (A11). The custom port monitor 42 identifies the folder corresponding to the user specified by the acquired user ID and stores the acquired print data in the identified folder (A12). In some cases, the custom port monitor 42 may modify the user permissions for itself (described later in greater detail). The folder corresponding to the user is a folder that includes the username of the user in the folder name, for example, and is provided in the shared folder 45 of the server 3 for each user. For this reason, print data transmitted from the client PC 1 can be stored in the folder corresponding to the user that issued the print instruction. In the present embodiment, the case where a folder corresponding to a user includes the username of the user in its folder name will be described, however, the present disclosure is not limited to the case described in the present embodiment. The folder corresponding to a user may be a folder specified by the user ID, i.e., identification information for identifying the user. Hereinafter, the folder corresponding to the user is also referred to as "folder for the user," or simply "user folder."

User permissions indicating whether access is authorized are set for each user folder. A user whose setting is administrative privileges, i.e., administrator can access all folders and all files in the shared folder 45. Users other than the administrator can only access folders accessible according to their own user permissions. The administrator of the server 3 may set user permissions with respect to a user other than the administrator so that the user can access only folders that includes his/her own username in their folder name. Additionally, a user not permitted to use the printing system 100 has no user permissions set for accessing the shared folder 45 and cannot access any folders within the shared folder 45.

Figure 3:
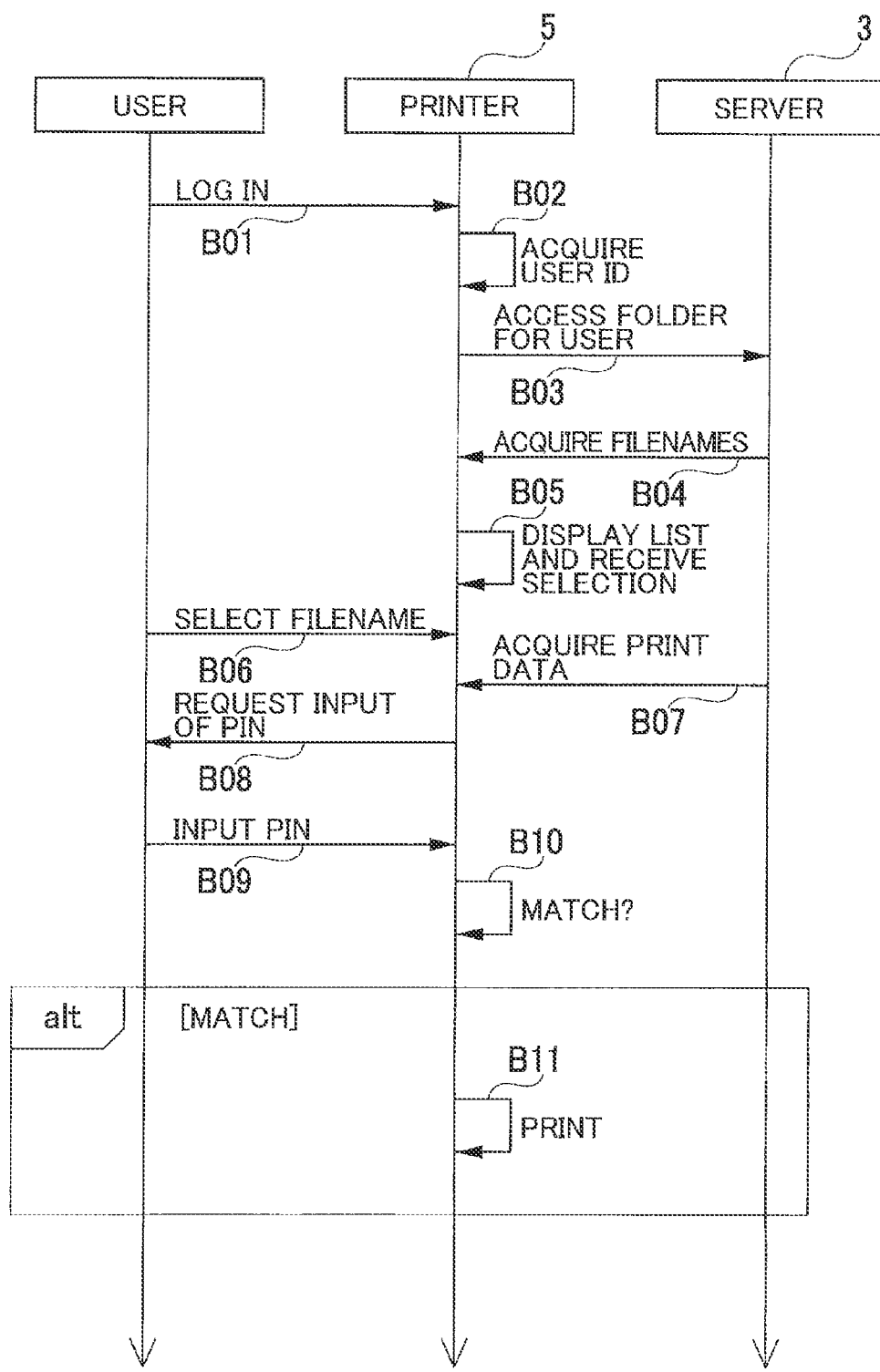
FIG. 3 is a sequence chart illustrating an overview of a second procedure for executing a print on the printer of the printing system according to the first embodiment of the present disclosure.

Next, an overview of the second procedure will be described with reference to FIG. 3. In the second procedure, the user inputs login information into the printer 5 to log in to the printer 5 (B01). The printer 5 performs login authentication based on the inputted login information. The method of logging in to the printer 5 may entail the user inputting a user ID, a password, and the like into the user interface 53 or inputting information by scanning an ID card or a fingerprint or palm print, for example. The login information inputted into the printer is an example of the identification information for the user in the present disclosure. The printer 5 may also transfer the login information to the server 3 or an authentication server and may receive the authentication results.

The printer 5 uses the user information 62 stored in the memory 52, for example, to determine whether the user of the inputted login information is a registered "sharing user". A "sharing user" is a user that the administrator has registered on the server 3, as described later. If login authentication on the printer 5 was unsuccessful or the logged-in user is determined not to be a sharing user, the printer 5 does not execute a shared printing process based on the shared print program 61. Note that processes other than shared printing may be executed when the user is not a sharing user.

If login authentication is successful and the user is determined to be a sharing user, the printer 5 executes the shared printing process according to the shared print program 61. The printer 5 acquires the user ID for the logged-in user based on the inputted login information (B02). The inputted login information may also include the user ID. Additionally, the printer 5 acquires access information for accessing a folder corresponding to the acquired user ID, i.e., a folder that includes the username of the logged-in user in the folder name, among the folders within the shared folder 45 of the server 3.

Access information may be stored in the user information 62 by the administrator of the printing system 100, for example. The access information may include the pathname for the user folder, and the user ID and password, for example. The user ID and password in the access information may be information common to the login information used to log in to the printer 5. Further, administrative privileges may be set for the printer 5, in which case the CPU 51 may acquire access information of the administrator. However, if access information for an individual user is used to access the server 3, the print data is more secure since the user can access the folder for the user but is prevented from accessing folders for other users.

Next, the printer 5 uses the acquired access information to access the folder for the user in the shared folder 45 on the server 3 (B03). By including the username in the folder name, the CPU 51 can easily distinguish the folder to be accessed.

The printer 5 acquires the filenames of all files stored in the accessed folder (B04). Next, the printer 5 displays a list of the acquired filenames on the user interface 53 to receive a selection by the user (B05). In some cases, the filename may include a username specifying the user that issued the print instruction and time information specifying the time that the server 3 received the print instruction, as will be described later.

Figure 4:
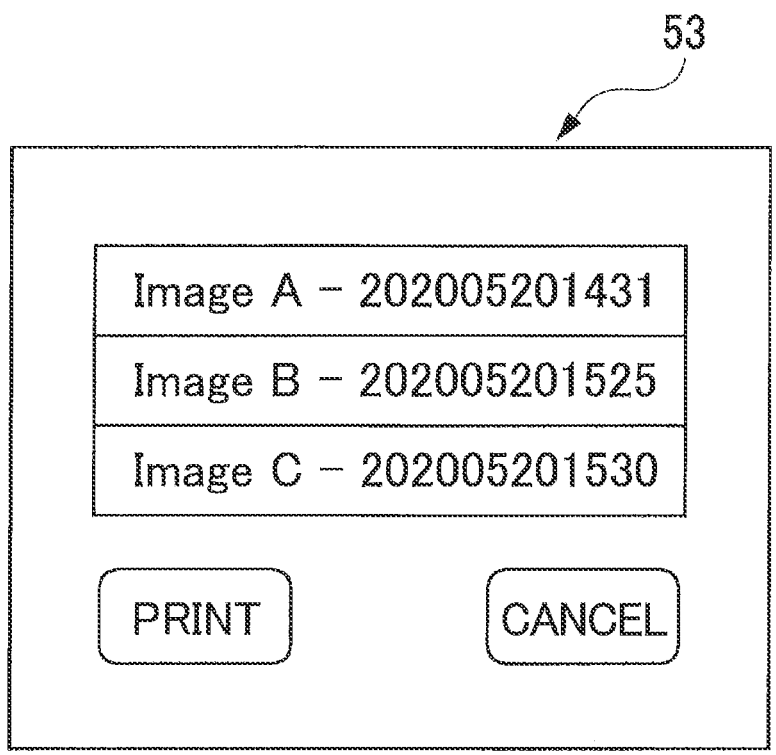
FIG. 4 is an example of a screen displaying a list of filenames on the printer to receive a selection of a file.

The screen displaying the list of filenames includes a PRINT button for receiving an instruction to print the selected file, and a CANCEL button for receiving an instruction to quit the shared print, as illustrated in FIG. 4. In the example of FIG. 4, the filenames are formed by adding time information after the filename assigned by the user (Image A, etc.). The time information includes numbers representing the year, month, day, hour, and minute. Note that if the folder for this user does not include a file with printable data, the printer 5 may display a message indicating that there are no files to print, and the CANCEL button for receiving a command to quit the shared print.

The user selects the filename of a desired file to be printed from the list of filenames via the user interface 53 (B06). The printer 5 acquires print data corresponding to the selected filename from the shared folder 45 of the server 3 (B07). By acquiring only the selected print data, this process can reduce load on the printer memory.

The printer 5 determines whether the acquired print data is print data for a secure print. When determining that the print data is for a secure print, the printer 5 displays a screen for receiving entry of a PIN (B08). When a file for a secure print has been selected, information for the PIN is added to this print data. The user inputs the PIN set for the print data via the user interface 53 (B09).

The printer 5 determines whether the PIN inputted in B09 matches the PIN added to the print data acquired in B07 (B10). Thus, adding a PIN to the print data and comparing this PIN to an inputted PIN in addition to login authentication further enhances the security of the print data.

When determining that the PINs match ([MATCH]), the printer 5 executes a print using the image-forming engine 55 based on the print data (B11). After printing is complete, the printer 5 deletes the print data acquired from the server 3. The printer 5 may also transmit a command to the server 3 to delete the print data from the server 3. On the other hand, if the selected file does not include print data for a secure print, the printer 5 does not prompt the user to input a PIN but executes the print without performing the processes in B08 through B10.

Further, if the printer 5 determines that the PINs do not match, the printer 5 displays a message indicating that the inputted PIN is incorrect and does not execute the printing operation. At this time, the printer 5 may allow the user to re-enter the PIN or to select a different file.

Note that the printer 5 may accept a plurality of selected files from the displayed list of filenames. When a plurality of files has been selected, the printer 5 may execute the procedure in B07 through B11 sequentially for all selected files.

Next, steps in the process executed by the server 3 will be described with reference to flowcharts. The processes described below and each process step in the flowcharts is essentially a process performed by the CPU 31 or the like according to instructions described in programs. That is, processes with action descriptions such as "determine," "extract," "select," "calculate," "set," "identify," "acquire," "receive," and "control" represent processes performed by the CPU 31 or the like. Processes performed by the CPU 31 and the like include hardware control using the application programming interface (hereinafter abbreviated as "API") in the OS of the server 3 or the like. However, a description of the role of the OS is omitted in this specification when describing operations in the programs. That is, a description below that indicates "program B controls hardware C" may indicate that "program B controls hardware C using the API of the OS." Further, a process executed by the CPU 31 and the like according to instructions described in a program may be described using abbreviated expressions, such as "the CPU 31 executes." Similarly, a process executed by the CPU 31 and the like according to instructions described in a program may be described using expressions that omit the CPU, such as "program A executes."

Note that the term "acquire" in this specification is used as a concept that does not necessarily require a request. In other words, a process by which the CPU 31 or the like receives data without requesting that data is included in the concept of "the CPU 31 acquires data." Further, the term "data" described herein is expressed as bit strings that can be read by a computer. Data of different formats are treated as the same data when the content of the data is essentially the same. The same holds true for "information" in this specification. Further, the terms "requesting" and "instructing"

are concepts that denote outputting information to another device indicating a request and an instruction, respectively. Further, information indicating a request and information indicating an instruction will simply be described as a "request" and an "instruction," respectively.

Further, a process performed by the CPU 31 or the like to determine whether information A indicates circumstance B may be described conceptually as "determining whether circumstance B based on information A." A process in which the CPU 31 or the like determines whether information A indicates circumstance B or circumstance C may be described conceptually as "determining whether circumstance B or circumstance C based on information A."

Figure 5:
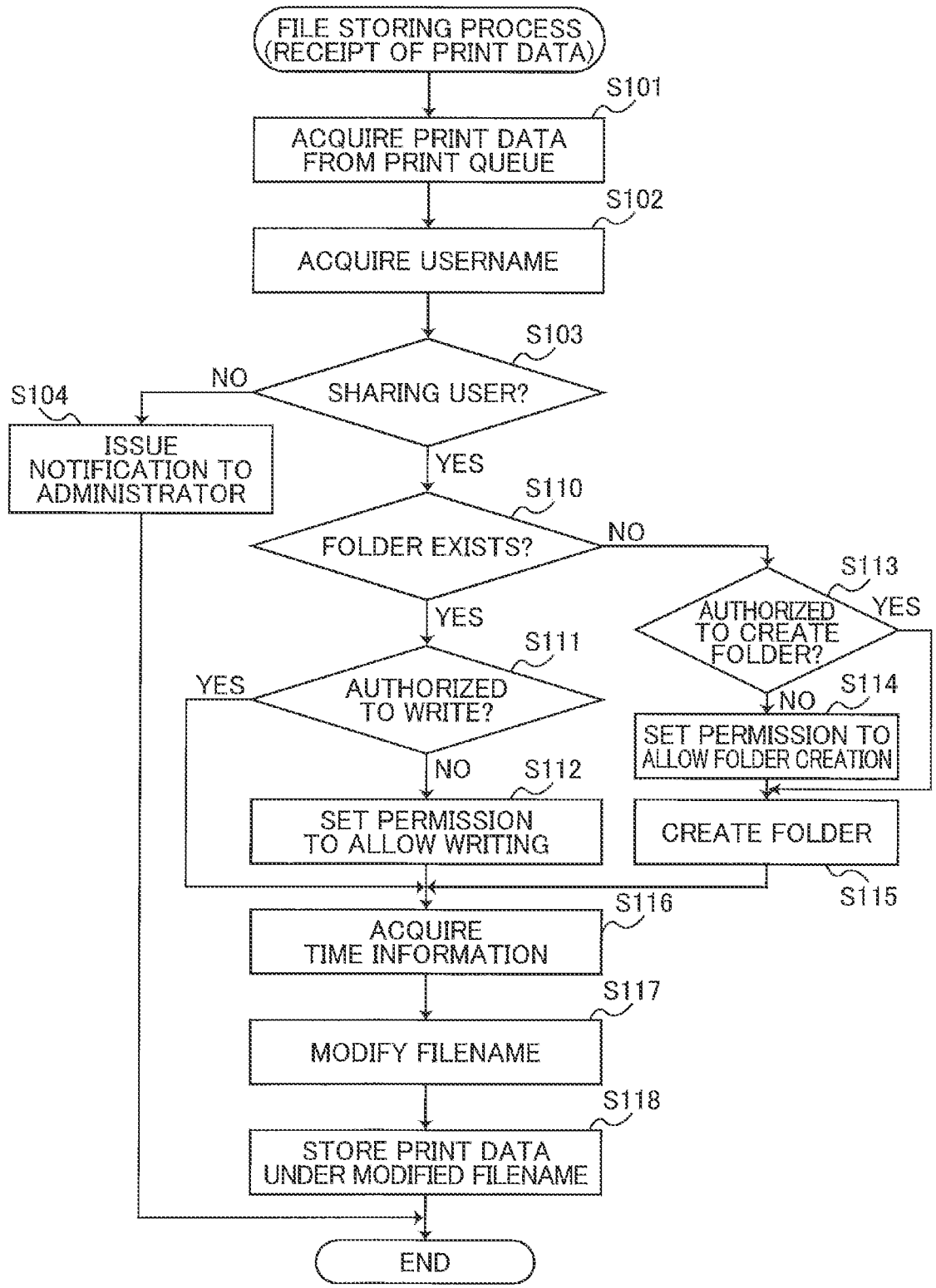
FIG. 5 is a flowchart illustrating steps in a file storing process performed on a custom monitor of the server in the printing system according to the first embodiment of the present disclosure.

Next, steps in a file storing process performed on the custom port monitor 42 to implement the operations of the first procedure described above will be described with reference to the flowchart in FIG. 5. The CPU 31 of the server 3 executes this process when the server 3 receives print data specifying the print queue 44 from the client PC 1 or the like.

In S101 at the beginning of the file storing process, the CPU 31 first acquires print data received by the server 3 and transferred to the print queue 44 (A09 in FIG. 2). This print data was generated by the client PC 1 or the like and transmitted to the server 3 in A07 of FIG. 2.

In S102 the CPU 31 acquires the user ID included in the print data and the username corresponding to the user ID (A11 in FIG. 2). When the user ID included in the print data is not a username, the CPU 31 acquires the username based on user information or the like stored in the memory 32, for example.

In S103 the CPU 31 determines according to this user ID whether the user that transmitted the print data has user permissions to access the shared folder 45, i.e., whether the user is a sharing user of the printing system 100. As described before, a "sharing user" is a user that the administrator has registered on the server 3, and user permissions set with respective to sharing users allow access to the shared folder 45.

If the user is not a sharing user (S103: NO), in S104 the CPU 31 issues a notification to the administrator of the printing system 100 indicating that access was received from a non-sharing user, and subsequently ends the file storing process. In this case, the CPU 31 may delete the print data acquired in S101 prior to ending the process.

However, if the CPU 31 determines that the user is a sharing user (S103: YES), in S110 the CPU 31 determines whether any folder in the shared folder 45 has a folder name that includes the username of this user. If such a folder exists (S110: YES), in S111 the CPU 31 determines whether the user permissions set for the custom port monitor 42 allow writing to this folder.

When the custom port monitor 42 is started up, the user permissions possessed by the user starting the custom port monitor 42 are set with respect to the custom port monitor 42. If the user from which print data was received is not the user that started up the custom port monitor 42, the custom port monitor 42 cannot write to the folder for the user corresponding to the print data in that condition. If the CPU 31 determines that the custom port monitor 42 is not authorized to write to this folder (S111: NO), in S112 the CPU 31 modifies the permissions with respect to the custom port monitor 42 to allow writing to this folder. The process of S112 is an example of the (p) modifying and the (e) modifying of the present disclosure. Write permissions for writing to a folder may be administrative privileges or user permissions for the user corresponding to the print data, for example. The custom port monitor 42 can modify and set its own user permissions.

On the other hand, if the CPU 31 determines that the shared folder 45 does not include a folder with a folder name that includes the username therein (S110: NO), in S113 the CPU 31 determines whether the permissions set with respect to the custom port monitor 42 allow the creation of new folders in the shared folder 45. If the CPU 31 determines that the permissions do not allow folder creation (S113: NO), in S114 the CPU 31 modifies the permissions set with respect to the custom port monitor 42 to allow folder creation. Permissions for allowing folder creation may be administrative privileges, for example. By creating a folder when there exists no folder corresponding to the username of a sharing user, it is possible to avoid a situation in which the print data cannot be stored to any folder. Note that the custom port monitor 42 may have administrative privileges set upon startup, in which case the determinations in S111 and S113 and the modifications of user permissions in S112 and S114 become unnecessary.

After completing the process in S114 or when determining in S113 that the custom port monitor 42 has permissions to create a new folder (S113: YES), in S115 the CPU 31 creates a folder name by adding the username acquired in S102 to the common folder name and creates a folder with this folder name in the shared folder 45. The process of S115 is an example of the (c) creating of the present disclosure.

After completing the process in S112 or S115 or when determining in S111 that the custom port monitor 42 has permissions for writing to the folder for the user (S111: YES), in S116 the CPU 31 acquires time information from the OS 41 specifying the current date and time. The time information indicates the time at which this file storing process was executed and is the current time or a combination of the current year, month, and day with the current time.

In S117 the CPU 31 modifies the filename for the print data acquired in S101 to a name that is informative. The information being provided may be the username acquired in S102, the time information acquired in S116, or a combination of the username and time information, for example. Here, the CPU 31 may create a modified filename by adding a delimiting character such as a hyphen, underscore, or parenthesis after the filename of the print data and by further adding a character string specifying the information being provided. Thus, even if a plurality of files with print data having the same filename is received from the same user, the files can still be differentiated from each other when stored under filenames that include time information, for example. These username and the time information are examples of the additional information of the present disclosure.

In S118 the CPU 31 stores the print data in the folder for the user under the modified filename (A12 in FIG. 2). The process of S118 is an example of the (b) storing of the present disclosure. After completing the process in S118, the CPU 31 ends the file storing process.

According to the printing system 100 of the first embodiment described above, the server 3 stores print data received from every PC in the shared folder 45. Since user permissions are set to indicate whether a user can access the shared folder 45, a third party is prevented from indiscriminately accessing print data stored on the server 3. However, user permissions allowing access to the shared folder 45 are set with respect to the custom port monitor 42 and the printer 5. Therefore, the custom port monitor 42 can store print data in the shared folder 45, and the printer 5 can acquire print data from the shared folder 45 to print.

Further, since a printer is shared through the shared folder 45 of the server 3 in this embodiment, a plurality of PCs can use the printer, and a plurality of printers can be used with the same ease. For example, the printing system 100 of the present embodiment includes the printer 6 having the same model and configuration as the model and configuration of the printer 5. Hence, the printer 6 can execute the operations illustrated in FIG. 3 just like the printer 5 and can use the same type of print data as the printer 5 for printing. Thus, when issuing a print instruction on the client PC 1 or 2, the user need not differentiate between the printers 5 and 6. The user may simply specify "shared printer," and the custom port monitor 42 will store the print data in the folder for the user in the shared folder 45. Thereafter, by logging into one of the printers 5 and 6, the user can print out the print data in the same manner on either printer.

Further, in the first procedure of the embodiment, the custom port monitor 42 includes additional information in the filename of the print data when storing the data. Accordingly, in the second procedure the user can easily distinguish among print data when selecting desired data. Adding the username as additional information makes it easy to see which file belongs to whom and facilitates users in distinguishing among print data. Adding time information as additional information also enables users to easily distinguish among print data since the user can see when the print data was stored.

In the conventional technology, the print server is provided with a web server function. The print server may be further provided with an authentication function for determining whether to allow access, a search function to search for print data belonging to the specified user, and a transfer function for transmitting specified print data. This configuration ensures the security of print data by not allowing printers or other external devices direct access to the folder. However, this configuration requires that the print server be provided with many functions and increases the load on the server side. The configuration of the embodiment described above, on the other hand, can ensure the security of print data through a simple structure without requiring the server 3 to have those functions.

Next, a printing system according to a second embodiment of the present disclosure will be described while referring to the accompanying drawings. As in the first embodiment, the printing system 100 in the second embodiment having the same structure as the printing system 100 in the first embodiment can execute the first procedure for issuing a print instruction on the client PC 1 or 2, and a second procedure for executing a printing operation on the printer 5 or 6. In the printing system 100 according to the second embodiment, the server 3 stores print data in the shared folder 45 based on a print instruction received from the client PC 1 or 2, and the printer 5 or 6 reads and prints the print data stored on the server 3.

In the second embodiment, the server 3 generates print data based on data received from the client PC 1 or 2, and the printer driver 43 stores the print data in a folder corresponding to the user. This part differs from the server 3 according to the first embodiment in which the custom port monitor 42 stores the print data. In other words, part of the first procedure executed in the second embodiment differs from that in the first embodiment. In the following description, structures and processes similar to those in the first embodiment are designated with the same reference numerals to avoid duplicating description.

In the second embodiment, the custom port monitor 42 of the server 3 does not execute the file storing process described in the first embodiment. Since the custom port monitor 42 is not used in the second embodiment, the custom port monitor 42 may be omitted from the server 3 or need not be installed on the server 3. In the second embodiment, the printer driver 43 is an example of the set of program instructions of the present disclosure. Below, the description in the first embodiment for assigning a PIN to the print job has been omitted, but a PIN may be assigned to print jobs in the second embodiment, as well.

Here, the first procedure according to the second embodiment will be described with reference to FIG. 6. Steps in FIG. 6 that are equivalent to those in the first embodiment are assigned the same step numbers as those used in FIG. 2. In the first procedure of the second embodiment, the user logs in to the client PC 1 and issues a print instruction within the printing application program 22 or the like (A01). The user specifies the print queue 24 in this example when issuing the print instruction through the printing application program 22 or the like. The printing application program 22 transfers a print command to the OS 21 based on the print instruction received from the user (A02). The print command includes image data representing an image to be printed, and parameters related to printing.

A graphics device interface (GDI) of the OS 21 generates intermediate data based on the received print command (C01). Intermediate data may be data that has not undergone rendering and may not be print data that the printer 5 can use for printing as is. Intermediate data may be generated during the process of generating print data from the image data handled by the printing application program 22, such as a page description language (PDL). The OS 21 transmits the generated intermediate data to the server 3 (C02).

The OS 41 of the server 3 receives the intermediate data transmitted from the client PC 1. On the server 3, the OS 41 passes the intermediate data to the printer driver 43 (C03), and the printer driver 43 begins generating print data (C04). While generating the print data, the printer driver 43 queries the OS 41 for the login information of the client PC 1 that transmitted the intermediate data (C05). The login information includes information on a user ID or a username indicating the user currently logged in to the client PC 1. The printer driver 43 acquires the login information of the client PC1, that is, information on the user ID or username from the OS 41 (C06). The printer driver 43 generates the print data by rendering the intermediate data and includes the information on the username acquired from the OS 41 in the print data.

Since the data received by the server 3 in the second embodiment is intermediate data that has not undergone rendering, the printer driver 43 must at least perform rendering. Therefore, intermediate data received by the server 3 is passed to the printer driver 43. In the first embodiment, data received by the server 3 is print data that has undergone rendering. Accordingly, since the printer driver 43 need not perform rendering in the first embodiment, the printer driver 43 may not need to execute any processing.

The printer driver 43 impersonates system permissions (C07). When initiating a process upon receiving intermediate data, the printer driver 43 operates under user permissions possessed by the user having the user ID corresponding to the intermediate data. The printer driver 43 uses information preliminarily provided in the OS 41 to impersonate the system permissions.

The printer driver 43 further identifies the folder corresponding to the username acquired in C06 and stores the rendered print data generated in C04 in the specified folder (C08). After storing the print data, the printer driver 43 cancels the permissions impersonation and returns to its original permissions (C09).

As in the first embodiment, a user folder is provided in the shared folder 45 for each user. By impersonating system permissions, the printer driver 43 can store print data in any folder within the shared folder 45. By impersonating system permissions, the printer driver 43 can also create a new folder for a user when no folder exists for that user. Accordingly, when a print instruction is received from the client PC 1, print data representing the image for which the print instruction was issued is stored in a folder corresponding to the user that issued the print instruction.

Note that the print data generated by the printer driver 43 may be transferred to the custom port monitor 42 via the OS 41. For example, when the printer driver 43 is installed on the server 3 in the present embodiment, the output port for print data outputted by the custom port monitor 42 is set to the NUL port. In other words, the custom port monitor 42 is configured not to output received data in the present embodiment. Therefore, the custom port monitor 42 will not output print data transferred thereto.

As in the first embodiment, print data in the second embodiment is stored in a folder within the shared folder 45 of the server 3 that is associated with the user ID of the user issuing the printing instruction. Therefore, as in the first embodiment, the printers 5 and 6 can acquire print data from the server 3 to print. The second procedure in which the printer 5 or 6 prints according to the print data acquired from the server 3 is identical to that in the first embodiment and will not be described here.

Figure 7:
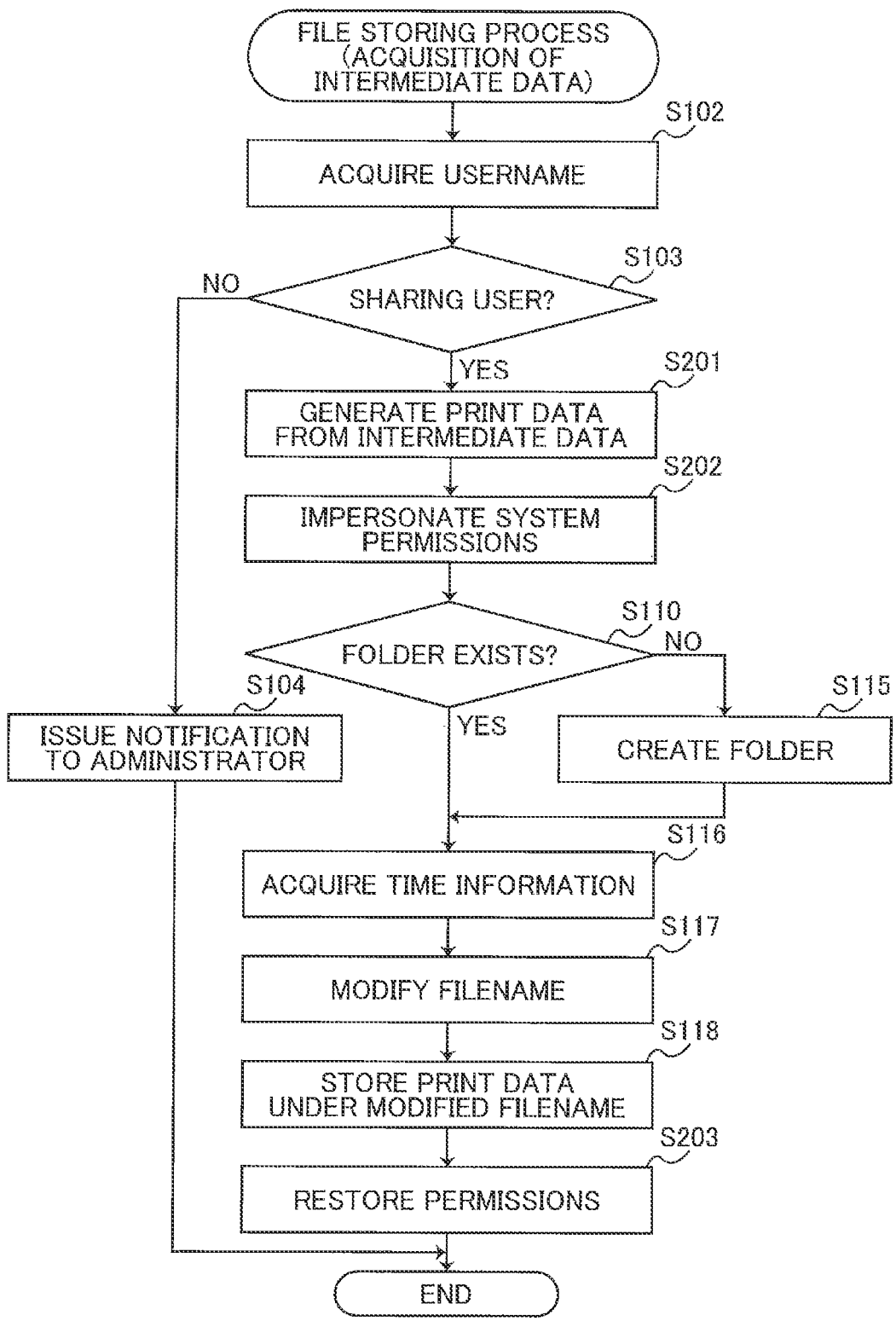
FIG. 7 is a flowchart illustrating steps in a file storing process performed on a printer driver of the server in the printing system according to the second embodiment of the present disclosure.

Next, steps in the file storing process according to the second embodiment will be described with reference to the flowchart in FIG. 7. The file storing process of the second embodiment is performed according to the printer driver 43 to implement the operations of the first procedure in the second embodiment. The CPU 31 of the server 3 executes this process when the printer driver 43 acquires intermediate data. The process in which the printer driver 43 acquires the intermediate data is an example of the (g) acquiring of the present disclosure. The file storing process of FIG. 7 is based on a program that differs from the first embodiment but includes common steps with the file storing process of the first embodiment. Steps in FIG. 7 that are common to those in FIG. 5 are designated with the same step numbers.

Figure 6:
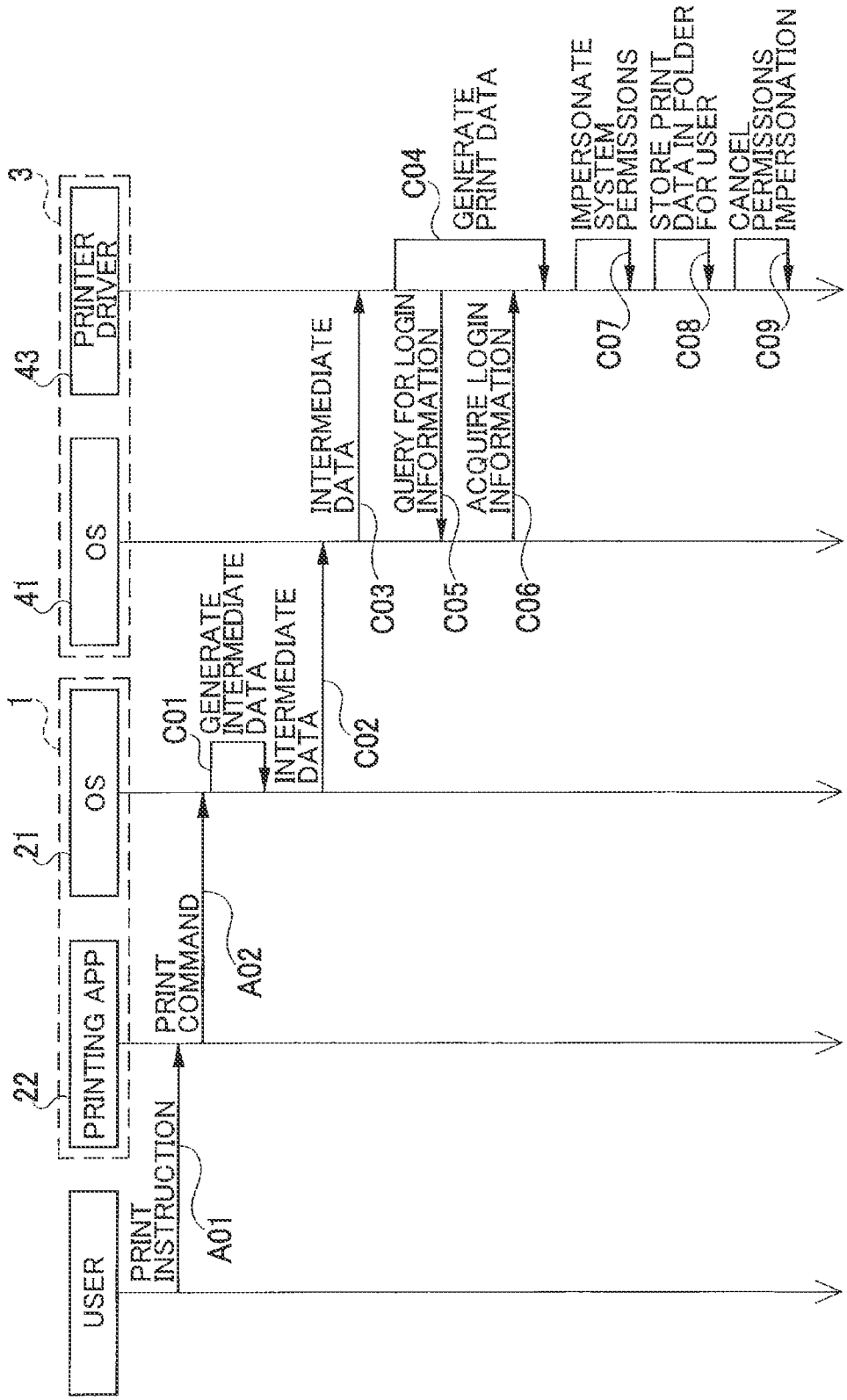
FIG. 6 is a sequence chart illustrating an overview of the first procedure for storing print data in a shared folder provided in a server of a printing system according to a second embodiment of the present disclosure.

In S102 at the beginning of the file storing process, the CPU 31 acquires the username associated with the acquired intermediate data (C06 in FIG. 6). In S103 the CPU 31 determines whether the user that issued the print instruction is a sharing user with user permissions for accessing the shared folder 45.

If the CPU 31 determines that the user is not a sharing user (S103: NO), in S104 the CPU 31 issues a notification to the administrator of the printing system 100 indicating that access was received from a non-sharing user, and subsequently ends the file storing process. In this case, the CPU 31 may delete the intermediate data acquired at the beginning of the process prior to ending the process.

However, if the CPU 31 determines that the user is a sharing user (S103: YES), in S201 the CPU 31 generates print data by rendering the intermediate data (C04 in FIG. 6). The process of S201 is an example of the (h) rendering of the present disclosure. In S202 the CPU 31 impersonates the system permissions using information from the OS 41 (C07 in FIG. 6). The process of S202 is an example of the modifying of the present disclosure. In this way, the CPU 31 can create a new folder in the shared folder 45 and can write data to the folder.

In S110 the CPU 31 determines whether any folder in the shared folder 45 has a folder name that includes the username acquired in S102. If such a folder does not exist (S110: NO), in S115 the CPU 31 creates a folder name by adding the username acquired in S102 to the common folder name and creates a folder with this folder name in the shared folder 45.

After completing the process in S115 or when determining in S110 that there exists a folder with a folder name that includes therein the username acquired in S102 (S110: YES), in S116 the CPU 31 acquires time information from the OS 41 specifying the current date and time. In S117 the CPU 31 modifies the filename for the print data generated in S201 to a name formed by adding the time information to the filename of the acquired intermediate data. Thus, the time information is appended to the filename of the print data, as illustrated in the example of FIG. 4. The added information may also be a username or a combination of the username and the time information.

In S118 the CPU 31 stores the print data in the folder for the user under the modified filename (C08 in FIG. 6). The process of S118 is an example of the (g) storing of the present disclosure. After storing the file, in S203 the CPU 31 restores the permissions from those impersonated in S202 to the original permissions (C09 in FIG. 6), and subsequently ends the file storing process.

According to the printing system 100 of the second embodiment described above, print data based on intermediate data received from the client PC 1 or 2 is stored in the shared folder 45 of the server 3. In this embodiment, the printer driver 43 executes various processes for storing the print data. The printer driver 43 is a program provided by the vendor of the printers 5 and 6. Unlike the first embodiment in which the custom port monitor 42 stores the print data, the printer driver 43 is less likely to be restricted by the OS 41 and thus can easily implement the process. However, in the first embodiment, the printer driver 23 of the client PC 1 or 2 performs rendering of print data, thereby lightening the load on the server 3.

The embodiments described above are merely examples, and the present disclosure is not intended to be limited by these examples. It would be apparent to those skilled in the art that various improvements and modifications may be made to the technology disclosed in this specification without departing from the spirit of the disclosure. For example, the devices in the specification may be of any number and are not limited to the numbers of devices illustrated in the drawings. Further, the client PCs are not limited to PCs but may be smartphones or tablet computers, for example.

Further, the printer may be any device having a printing function, such as a multifunction peripheral, a copy machine, or a facsimile machine. If the printer possesses functions in addition to the function for shared printing, the printer may receive a selection for a function to use and may execute a process for shared printing upon receiving an instruction to use the shared printing function, for example. The printer may also limit the functions that can be used based on the user that is currently logged in. For example, some users may be permitted to use the printer but not permitted to utilize shared printing.

In the embodiments described above, a printer driver for the printers 5 and 6 is installed on both the client PCs 1 and 2 and the server 3. However, the function for adding user ID and PIN information to print data may be provided only in the printer drivers 23 installed on the client PCs 1 and 2 and not in the printer driver 43 installed on the server 3, for example. Further, the function for generating print data that a printer can use based on the image to be printed in the first embodiment may be provided in only the printer drivers 23 installed on the client PCs 1 and 2 or in only the printer driver 43 installed on the server 3. For example, when the printer driver 43 of the server 3 has a function for generating print data, the client PCs 1 and 2 add the user ID and PIN to the document file or image file that includes the image to be printed and transmit the file with this added information to the server 3. If data that the custom port monitor 42 of the server 3 acquires from the print queue 44 is not print data that can be used for printing on the printer, the custom port monitor 42 may transfer this data to the printer driver 43 instructing the printer driver 43 to generate the print data.

Further, while the printers 5 and 6 are the same model in the present embodiments, the printing system may include printers of different models. If the printer drivers and print queues corresponding to these different models are themselves different, the server 3 may be provided with a shared folder for each printer, and the custom port monitor 42 or printer driver 43 may be configured to store print data in the shared folder corresponding to the print queue. Further, a printer driver may be installed on the client PC 1 or the like for the printer used by the user of the client PC 1 or the like. Further, each printer may itself acquire print data from the corresponding shared folder.

In the present embodiments, all print data regardless of whether the print data will be used in a secure print is stored in the shared folder 45 when printing on a shared printer such as the printers 5 and 6, but the print data stored in the shared folder 45 may be limited to only print data used in secure prints. In this case, the custom port monitor 42 or printer driver 43 may determine whether acquired print data is to be used in a secure print. When the print data is to be used in a secure print, the custom port monitor 42 or printer driver 43 may execute the file storing process described in the embodiments. When a secure print is not to be performed, the custom port monitor 42 or printer driver 43 may simply transmit the print data to the printer.

In the present embodiments, the user of a client PC and printer need not log in to the server 3 since the shared folder 45 is used, but the system can be configured to require a login operation to store or acquire print data. In this case, the client PC and printer may prompt the user separately to input access information for logging in to the server 3 or may use the login information used for logging in to the client PC or printer to log in to the server 3.

Further, the user ID used on the client PCs 1 and 2, the user ID for accessing the server 3, and the user ID for logging in to the printers 5 and 6 are not particularly distinguished in the present embodiments. However, these user IDs may be the same information or different information that is associated, provided that the information can identify the user.

In any of the flowcharts disclosed in the embodiments, the plurality of processes that make up any of the plurality of steps may be executed in parallel, or the order in which the processes are performed may be modified in any way that does not produce any inconsistencies in the processes.

The processes disclosed in the embodiments may be executed by a single CPU, a plurality of CPUs, an ASIC or other hardware, or a combination of these components. Further, the processes disclosed in the embodiments may be achieved through a storage medium that stores the programs used to implement those processes or according to any of various other methods or formats.

What is claimed is:

1. A printing system comprising:
   a printer;
   a server device connectable to the printer, the server device comprising:
      a computer; and
      a memory configured to store therein a set of program instructions, and a folder corresponding to each of a plurality of users, the folder being a shared folder accessible from an external device other than the server device, user permissions being set for the folder to indicate whether access to the folder is allowed, the user permissions allowing the printer to access to the folder; and
   a client device connectable to the server device, the client device being configured to perform:
      (a) transmitting print data to the server device, the print data being based on an image to be printed and being associated with identification information for identifying a user,
   wherein the set of program instructions, when installed on and executed by the computer, causes the server device to perform:
      in response to receiving the print data from the client device, (b) storing the print data in the folder corresponding to the user identified by the identification information associated with the print data, and
   wherein the printer is configured to store access information for accessing the folder with the user permissions allowing to access to the folder, the printer being configured to perform:
      (c) receiving an input of the identification information;
      (d) acquiring the access information;
      (e) identifying the folder corresponding to the user identified by the identification information received in (c);
      (f) accessing the folder identified in (e) using the access information acquired in (d);
      (g) acquiring the print data stored in the folder accessed in (f); and
      (h) printing the image based on the print data acquired in (g).

2. The printing system according to claim 1, wherein the set of program instructions includes a port monitor, and
   wherein the port monitor, when installed on and executed by the computer, causes the server device to perform the (b) storing in response to receiving the print data from the client device.

3. The printing system according to claim 2, wherein the memory is configured to further store a printer driver corresponding to the printer and a print queue allocated for the printer driver, and
   wherein when the server device receives the print data specifying the print queue allocated for the printer driver from the client device, the (b) storing acquires the print data from the print queue and stores the print data in the folder corresponding to the user identified by the identification information associated with the print data.

4. The printing system according to claim 3, wherein the client device includes a plurality of client devices each of which is connectable to the server device, and
   wherein when the server device receives a plurality of pieces of print data specifying the print queue allocated for the printer driver from respective ones of the plurality of client devices, the (b) storing acquires each of the plurality of pieces of print data from the print queue and stores each of the plurality of pieces of print data in the folder corresponding to the user identified by the identification information associated with the each of the plurality of pieces of print data.

5. The printing system according to claim 1, wherein the set of program instructions includes a printer driver corresponding to the printer,
wherein the (a) transmitting transmits intermediate data to the server device, the intermediate data being the print data prior to undergoing rendering, the intermediate data being associated with the identification information, and
wherein the printer driver, when installed on and executed by the computer, causes the server device to perform the (b) storing in response to receiving the intermediate data as the print data from the client device, the (b) storing comprising:
(i) acquiring the intermediate data;
(j) rendering the intermediate data acquired in (i) to generate the print data; and
(k) storing the print data generated in (j) in the folder corresponding to the user identified by the identification information associated with the intermediate data.

6. The printing system according to claim 1, wherein the (a) transmitting comprises:
(l) receiving an input of authentication information; and
(m) transmitting the print data associated with the identification information and the authentication information to the printer,
wherein the printer is configured to further perform:
(n) receiving an input of the authentication information, and
wherein the (h) printing is performed in response to determining that the authentication information received in (n) matches the authentication information associated with the print data acquired in (g).

7. The printing system according to claim 1, wherein the printer is configured to further perform:
(o) displaying a list of a plurality of pieces of print data stored in the folder accessed in (f); and
(p) receiving a selection of target print data from among the plurality of pieces of print data, and
wherein the (g) acquiring acquires the target print data selected in (p) from the folder accessed in (f), and the (h) printing prints the image based on the target print data acquired in (g).

8. The printing system according to claim 1, wherein the set of program instructions, when installed on and executed by the computer, causes the server device to further perform:
(q) determining whether the user permissions set for the folder corresponding to the user identified by the identification information associated with the print data allow the set of program instructions to write to the folder; and
in response to determining that the user permissions do not allow the set of program instructions to write to the folder, (r) modifying the user permissions to allow the set of program instructions to write to the folder before performing the (b) storing.

9. The printing system according to claim 1, wherein the (b) storing comprises:
(s) receiving from the client device the print data associated with the identification information for identifying a logged-in user logging in to the client device;
(t) identifying the folder for which the user permissions allowing the logged-in user identified by the identification information to access to the folder are set; and
(u) storing the print data received in (s) to the folder identified in (t).

10. The printing system according to claim 1, wherein the printer is configured to store the access information in association with the identification information corresponding to each of the plurality of users, and
wherein the (d) acquiring acquires the access information stored in association with the identification information received in (c).

11. A non-transitory computer readable storage medium storing a set of program instructions installed on and executed by a computer in a server device connectable to a printer and a client device, the server device including a memory configured to store a folder corresponding to each of a plurality of users, the folder being a shared folder accessible from an external device other than the server device, user permissions being set for the folder to indicate whether access to the folder is allowed, the user permissions allowing the printer to access to the folder, the printer being configured to store access information for accessing the folder with the user permissions allowing to access to the folder, the set of program instructions comprising:
(a) acquiring print data received from the client device, the print data being based on an image to be printed and being associated with identification information for identifying a user; and
(b) storing the print data in the folder corresponding to the user identified by the identification information associated with the print data acquired in (a), the printer accessing the folder to acquire the print data stored in the folder using the access information stored therein and printing the image based on the print data.

12. The non-transitory computer-readable storage medium according to claim 11, wherein the memory is configured to further store a printer driver corresponding to the printer and a print queue allocated for the printer driver, the print data received from the client device being passed to the print queue, and
wherein the (a) acquiring acquires the print data from the print queue.

13. The non-transitory computer-readable storage medium according to claim 11, wherein the set of program instructions further comprises:
in response to determining that the folder corresponding to the user identified by the identification information associated with the print data acquired in (a) is not stored in the memory, (c) creating the folder before performing the (b) storing.

14. The non-transitory computer-readable storage medium according to claim 11, wherein the set of program instructions further comprises:
(d) determining whether the user permissions set for the folder corresponding to the user identified by the identification information associated with the print data allow the set of program instructions to write to the folder; and
in response to determining that the user permissions do not allow the set of program instructions to write to the folder, (e) modifying the user permissions to allow the set of program instructions to write to the folder before performing the (b) storing.

15. The non-transitory computer-readable storage medium according to claim 11, wherein the print data acquired in (a) has a filename, the (b) storing comprising:

(f) modifying the filename of the print data by adding additional information to the filename; and (g) storing the print data in the folder under the modified filename.

16. The non-transitory computer-readable storage medium according to claim 15, wherein a username is set for each of the plurality of users, the additional information being the username set for the user identified by the identification information associated with the print data.

17. The non-transitory computer-readable storage medium according to claim 15, wherein the additional information is time information specifying time at which the (b) storing is performed.

18. The non-transitory computer-readable storage medium according to claim 11, wherein the (a) acquiring acquires intermediate data transmitted from the client device, the intermediate data being the print data prior to undergoing rendering, the intermediate data being associated with the identification information, and wherein the (b) storing comprises:
(h) rendering the intermediate data acquired in (a) to generate the print data; and
(i) storing the print data generated in (h) in the folder corresponding to the user identified by the identification information associated with the intermediate data.

19. A printing system comprising:

a printer;

a server device connectable to the printer, the server device comprising:
  a computer; and
  a memory configured to store therein a set of program instructions, and a folder corresponding to each of a plurality of users, the folder being a shared folder accessible from an external device other than the server device, user permissions being set for the folder to indicate whether access to the folder is allowed, the user permissions allowing the printer to access to the folder; and a client device connectable to the server device, the client device being configured to perform:
  (a) transmitting print data to the server device, the print data being based on an image to be printed and being associated with identification information for identifying a user, wherein the set of program instructions, when installed on and executed by the computer, causes the server device to perform:
  in response to receiving the print data from the client device, (b) storing the print data in the folder corresponding to the user identified by the identification information associated with the print data, wherein the printer is configured to perform:
  (c) receiving an input of the identification information;
  (d) identifying and accessing the folder corresponding to the user identified by the identification information received in (c);
  (e) acquiring the print data stored in the folder identified and accessed in (d); and
  (f) printing the image based on the print data acquired in (e), wherein the set of program instructions includes a port monitor, wherein the port monitor, when installed on and executed by the computer, causes the server device to perform the (b) storing in response to receiving the print data from the client device, wherein the memory is configured to further store a printer driver corresponding to the printer and a print queue allocated for the printer driver, wherein when the server device receives the print data specifying the print queue allocated for the printer driver from the client device, the (b) storing acquires the print data from the print queue and stored the print data in the folder corresponding to the user identified by the identification information associated with the print data, wherein the client device includes a plurality of client devices each of which is connectable to the server device, and wherein when the server device receives a plurality of pieces of print data specifying the print queue allocated for the printer driver from respective ones of the plurality of client devices, the (b) storing acquires each of the plurality of pieces of print data from the print queue and stores each of the plurality of pieces of print data in the folder corresponding to the user identified by the identification information associated with the each of the plurality of pieces of print data.

* * * * *